United States Patent [19]

Murray

[11] 4,367,320

[45] Jan. 4, 1983

[54] PROCESS FOR SUSPENSION POLYMERIZATION OF STYRENIC MONOMERS

[75] Inventor: James G. Murray, East Brunswick, N.J.

[73] Assignee: Mobil Oil Corporation, New York, N.Y.

[21] Appl. No.: 248,660

[22] Filed: Mar. 27, 1981

Related U.S. Application Data

[63] Continuation-in-part of Ser. No. 221,655, Dec. 31, 1980, abandoned.

[51] Int. Cl.³ .......................... C08F 2/20; C08F 2/00; C08F 12/18; C08F 12/06
[52] U.S. Cl. .......................... 526/75; 526/79; 526/86; 526/201; 526/227; 526/234; 526/347.1
[58] Field of Search .............. 526/200, 201, 202, 234, 526/81, 86, 75, 79, 213, 215, 232.1, 233

[56] References Cited

U.S. PATENT DOCUMENTS

| | | | |
|---|---|---|---|
| 2,556,459 | 6/1951 | Wesp | 526/86 |
| 2,907,756 | 10/1959 | Doak | 526/81 |
| 3,328,374 | 6/1967 | Ronden | 526/200 |
| 3,503,908 | 3/1970 | Ingram | 526/200 |
| 3,647,723 | 3/1972 | Mysik et al. | 521/56 |
| 3,647,773 | 3/1972 | Ohe | 526/233 |
| 3,652,526 | 3/1972 | Bourget et al. | 526/81 |
| 3,786,115 | 1/1974 | Osuga | 526/200 |
| 3,819,597 | 6/1975 | Richards | 526/233 |
| 3,931,133 | 1/1976 | Desilles | 526/233 |
| 4,091,054 | 5/1978 | Saito | 526/200 |
| 4,241,191 | 12/1980 | Keppler | 526/201 |
| 4,271,281 | 6/1981 | Kelley | 526/201 |

*Primary Examiner*—C. A. Henderson
*Attorney, Agent, or Firm*—Charles A. Huggett; Michael G. Gilman; Edward F. Kenehan, Jr.

[57] ABSTRACT

There is provided a method for the suspension polymerization of one or more styrenic monomers. This method involves increasing the amount of substantially water insoluble free radical initiator in the suspension after the conversion of the monomer has reached at least 50%. The temperature of the suspension is at least 110° C. throughout the entire polymerization.

29 Claims, 4 Drawing Figures

PROCESS FOR SUSPENSION POLYMERIZATION OF STYRENIC MONOMERS

CROSS-REFERENCE TO RELATED APPLICATIONS

This application is a continuation-in-part of U.S. application Ser. No. 221,655, filed Dec. 31, 1980, now abandoned, the entire disclosure of which is incorporated herein by reference.

BACKGROUND OF THE INVENTION

Polymerization of styrene and other styrenic monomers may take place by a variety of techniques such as bulk or solvent polymerization, emulsion polymerization or suspension polymerization. In each of these techniques, polymerization results from a free radical induced, chain-propagation mechanism. Stated in simpler terms, styrenic monomers form polymers when contacted with free radicals. Accordingly, in order to cause styrenic monomers to polymerize, it is necessary to combine these monomers with free radicals.

There are two known techniques for providing free radicals for the polymerization of styrenic monomers. One such technique is to simply heat the styrenic monomers to a temperature, e.g., above 120° C., which causes the generation of free radicals by thermally induced interactions among these styrenic monomers. This technique is often referred to as thermal initiation. Another technique is distinguished from thermal initiation in that it involves combining catalytic quantities of free radical initiators with the styrenic monomers. These free radical initiators generate free radicals by thermally induced decomposition. Accordingly, both the "thermally induced" technique and the initiator induced technique are thermal in the sense that they both involve heating of the polymerization system. However, the initiator induced technique generally takes place at a lower temperature than the thermally initiated technique, the temperature of the initiator induced technique being such that free radicals are generated substantially from initiator decomposition as opposed to the interaction of styrenic monomers, particularly in the initial stages of the polymerization.

Free radicals not only initiate polymerization, the rate at which polymerization proceeds increases as the concentration of free radicals in the styrenic monomers increases. Also, the concentration of free radicals generated by a given quantity of styrenic monomers or free radical initiators increases as temperature increases. Accordingly, increasing temperature generally tends to increase rates of reaction at least immediately after the temperature is increased. However, if the temperature is held constant the polymerization rate will tend to decrease over time, because as the polymerization proceeds less and less styrenic monomer and/or free radical initiator are left to generate more free radicals. Accordingly, in order to drive the polymerization to completion, it is known to increase the temperature as the reaction proceeds. It is also known to use a plurality of free radical initiators which decompose at different temperatures. When such a plurality of free radical initiators is used, the temperature may be maintained at one temperature until one free radical initiator is substantially decomposed, and then the temperature may be increased to decompose the remaining initiators.

Free radicals could also be generated by incrementally incorporating free radical initiators with the styrenic monomers as the polymerization progresses. Such an incremental incorporation is known in the case of bulk or emulsion polymerizations. However, in the case of suspension polymerizations, special problems are presented with incremental additions of free radical initiators, due to the manner in which styrenic monomers are polymerized in such suspension polymerizations.

In suspension polymerizations, styrenic monomers are present in a suspension of droplets dispersed throughout a continuous water medium. Although the free radical initiators used in such suspension polymerizations are soluble in styrenic monomers, these initiators are substantially insoluble in water. Accordingly, it is most customary to incorporate all of the initiator or initiators with the styrenic monomers before the suspension polymerization is started.

The Doak U.S. Pat. No. 2,907,756, the entire disclosure of which is incorporated herein by reference and relied upon, suggests that an incremental addition of initiators may be made in a suspension polymerization of styrene but only during the initial stages of the polymerization. More particularly, it is stated that it is necessary to add all of the initiator before polymerization has progressed to such an extent that intimate mixing of catalyst and styrene monomer is precluded. Specifically, addition of initiator is terminated when the suspension reaches a temperature of about 115° C. (See Column 6, lines 8-14 of the Doak U.S. Pat. No. 2,907,756). Referring to Table II of the Doak U.S. Pat. No. 2,907,756 (See Column 7, lines 7-22), the percent conversion of the polymerization reaches about 49% at the time the suspension reaches a temperature of about 115° C.

It is understandable why the Doak U.S. Pat. No. 2,907,756 would seem to discourage one from adding initiator to the suspension during the later stages of polymerization. At these stages, two barriers to prevent mixing of initiators and monomers are present, namely, (1) the continuous water phase, in which the initiator is insoluble, and (2) the substantial amount of polymer which has formed. However, in spite of these barriers it has unexpectedly been found that initiator can indeed be effectually added to the later stages of a suspension polymerization, when such addition is made in accordance with the present invention.

SUMMARY OF THE INVENTION

This invention provides a method for the suspension polymerization of one or more styrenic monomers, wherein said styrenic monomer or monomers are pesent in a suspension of droplets of said monomer or monomers dispersed throughout a continuous water phase, said method comprising the steps of:
 (a) partially polymerizing said monomer or monomers in said suspension until a conversion of from 50% to about 90% is achieved; and
 (b) increasing the amount of substantially water insoluble free radical initiator in the suspension obtained according to the partial polymerization step (a) and substantially completing the suspension polymerication by a free radical initiation technique,
wherein the temperature of the suspension is at least 110° C. during the entire polymerization.

This invention further provides a method for the suspension polymerization of one or more styrenic monomers, wherein said styrenic monomer or monomers are present in a suspension of droplets of said monomer or monomers dispersed throughout a continuous water phase, said method comprising the steps of:
(a) partially polymerizing said monomer or monomers by a thermal initiation technique, wherein said suspension is maintained in the absence of a free radical initiator until a conversion of from about 50% to about 90% is achieved; and
(b) substantially completing the suspension polymerization of the suspension obtained according to the thermal polymerization step (a) by a free radical initiation technique, wherein the suspension is maintained in the presence of at least one substantially water insoluble free radical initiator.

DETAILED DESCRIPTION

The method of the present invention concerns the suspension polymerization of styrenic monomers. The term "styrenic monomers" as used herein is intended to connote aryl vinyl monomers such as styrene, ring-substituted alkyl styrenes and ring-halo-substituted styrenes. Particular styrenic monomers include styrene, paramethylstyrene, metamethylstyrene, vinyl toluenes (i.e., a mixture of paramethylstyrene and metamethylstyrene), para-t-butylstyrene and parachlorostyrene, a preferred styrenic monomer being paramethylstyrene. In addition to styrenic monomers, the polymerization system may contain up to about 35% by weight of one or more copolymerizable non-styrenic, vinyl monomers, based upon the entire weight of monomers present in the system. Such non-styrenic vinyl monomers include acrylic monomers such as acrylonitrile. Accordingly, the method of the present invention may be used to produce polymers which are copolymers as well as polymers which are homopolymers.

The suspension in which polymerization occurs is preferably stabilized throughout the entire polymerization by means of one or more stabilizers or suspending agents. For example, monomer may be mixed with water and a minor amount of a stabilizer or suspending agent such as tricalcium phosphate. Additionally, a small quantity (e.g., 0.001 to 0.05% by weight of the total charge) of a surface-active agent is preferably used to reduce surface tension. Surface active agents include nonionic, anionic or cationic materials including alkyl aryl sulfonates and octylphenoxy polyether alcohols. A preferred surface active agent is partially sulfonated polyparamethylstyrene extender which contains about 10 mole percent sulfonic acid groups. Such sulfonated polyparamethylstyrene extenders are described in the Murray U.S. Pat. No. 4,237,255, the entire disclosure of which is incorporated herein by reference and relied upon.

The water to monomer plus polymer ratio of the suspension may be, for example, from about 1:1.2 to about 3:1, preferably, the ratio of water to monomer plus polymer should be as small as possible to make efficient use of available reactor volume. More particularly, the water to monomer plus polymer ratio should preferably not exceed 1.2:1 during the entire polymerization. Although water may be added during the polymerization to compensate for minor volumetric shrinkage of the liquid phase as the polymerization proceeds, it is preferred to maintain a constant water to monomer plus polymer ratio throughout the entire polymerization.

The desired droplet size of the monomer may be achieved by an appropriate rate of stirring of the suspension. Generally, the droplets may range from about 5000 Angstroms to about 0.5 cm in diameter. Preferably, the droplets may be at least 0.15 cm in diameter or, in other terms, may be of sufficient size to obtain polymer particles of which better than 90% are retained on a 100 mesh screen.

The suspension may also contain other additives. For example, a coloring agent or dye may also be included in the suspension. More particularly, in the case of paramethylstyrene, a blueing agent may be used. It is further possible to include additives which stabilize the polymers which are produced from the suspension. One such stabilizer is a phenolic antioxidant, e.g., IRGANOX 1076, a tradename of Ciba-Geigy. Extrusion aids such as mineral oil may be included to aid in extrusion of the resulting polymer.

According to one embodiment of the suspension polymerization of the present invention, polymerization may take place in two separate stages. More particularly, the first stage may be a thermally initiated polymerization and the second stage may be an initiator initiated polymerization. According to another embodiment of the invention, at least one initiator may be present in the suspension throughout the entire polymerization. A common feature of both of the above-mentioned embodiments is that the suspension should be maintained at a temperature of at least 110° C., preferably 120° C. or more, throughout the entire polymerization. It is noted that, even when initiator is present in the suspension, polymerization may proceed by both initiator decomposition and strenic monomer interaction at such high temperatures, particularly during the latter stages of the polymerization. Preferably, the temperature of the suspension is constant or substantially constant throughout the entire polymerization. According to such a preferred isothermal or substantially isothermal technique, the temperature preferably does not vary more than about 5° C. during the entire polymerization.

In the thermally initiated stage of an embodiment of the suspension polymerization of the present invention, styrene is polymerized by heating in the absence of a free radical initiator. The temperature to which the suspension is heated depnds upon the particular styrenic monomers to be polymerized as well as the desired rate of polymerization to be achieved. For example, when styrene or paramethylstyrene are polymerized, the temperature of the suspension may be from about 120° C. to about 150° C. during the thermally initiated polymerization. Most preferably, this temperature should be approximately 130°-140° C. for these monomers.

The temperature of the suspension during the thermally initiated stage should preferably be sufficient to achieve a rate of polymerization such that a conversion of from about 50% to about 90% is achieved within a time frame of about 2 to about 8 hours. Preferably, the rate of polymerization may be permitted to gradually decrease, but should remain fairly constant during this period. Thus, for example, the rate of polymerization may be between about 30% conversion per hour and about 5% conversion per hour at any time during the thermally initiated polymerization stage. Accordingly, in the case of styrene or paramethylstyrene a temperature of as low as, e.g., 120° C. may be sufficient to initiate polymerization in the absence of a free radical initiator, but the rate of polymerization at this temperature may be undesirably slow with respect to preferred higher temperatures. Furthermore, when a suspension of these monomers is heated to a temperature as high as 160° C., the resulting polymer may have an undesirably low molecular weight, characterized by, e.g., a high melt index. One may also encounter suspension instability problems when the temperature of the suspension is undesirably high.

The end of the thermally initiated stage of the polymerization may be expressed in terms of the percent conversion achieved. More particularly, the thermally initiated stage ends after the conversion is at least 50% or about 50% but before the conversion reaches 90% or about 90%. Preferably, the thermally initiated stage ends after a 60-80% conversion of the monomer.

As an alternative to partial polymerization of styrenic monomer by a thermal polymerization technique, this partial polymerization may be optionally achieved by an initiator initiated technique by incorporation of at least one substantially water insoluble free radical initiator into the suspension. Examples of such free radical initiators include organic peroxy compounds such as lauroyl peroxide, benzoyl peroxide, t-butylperbenzoate, and t-butylperoxyacetate. Accordingly, it will be understood that the above-mentioned organic peroxy compounds are not necessarily absolutely water insoluble, particularly when used at temperatures in accordance with the present invention. Nonetheless, these compounds are substantially water insoluble and are quite distinguishable from the water soluble initiators used in emulsion polymerizations, such as potassium persulfate.

The substantially water insoluble initiators are preferably added to the polymerization suspension as suspensions themselves or as solutions in water miscible solvents. An example of such a suspension of an initiator is a suspension of benzoyl peroxide in methylene chloride containing a suspending agent such as "Gelvatol", a tradename of Monsanto, which is a polyvinyl alcohol. An example of a solution of an initiator which may be added to the polymerization suspension is a solution of t-butylperoxyacetate dissolved in methanol.

As with the thermally initiated stage of the polymerization, the temperature of the suspension containing free radical initiator should not be so high as to generate excessive free radicals, resulting in a low molecular weight product.

It is also noted that the initiator should be chosen so as to have a desirable decomposition rate at the temperatures of the present invention. For example, the initiator should preferably have a half life of from about 20 to about 30 minutes, most especially about 25 minutes, at the temperature of the suspension during the polymerization. When initiator is present in the suspension throughout the entire polymerization, a conversion of preferably at least 40%, most especially 55% or more, may be attained in the first hour of the polymerization.

Whatever technique is used to achieve a partial polymerization of the styrenic monomer, the remainder of the polymerization (e.g., at least 10% conversion) takes place in the presence of initiator. More particularly, after a 50% or about a 50%, but before a 90% or about a 90%, conversion is achieved the initiator content of the suspension is increased, e.g., by adding initiator to the suspension. It will be understood that the amount of initiator in the suspension may be increased before the conversion reaches 50% and/or after the conversion reaches 90%, as long as the amount of initiator in the suspension is increased when the conversion is between 50% and about 90%. It will further be understood that the above-mentioned expression, "the initiator content of the suspension is increased," connotes increasing this content from a content of zero to some positive value, as in the case where initiator is first added to the suspension after a partial polymerization by a thermally initiated technique.

Whenever styrenic monomer is first partially polymerized by a thermal initiation technique, it may be desirable to cool the suspension before the free radical initiator is incorporated therein. This cooling may take place, for example, by means of cooling coils. Preferably, however, the temperature of the suspension at the end of the thermally initiated stage and the nature of the free radical initiator are such that the initiator can be added to the suspension without cooling thereof. Thus, for example, when paramethylstyrene is thermally polymerized at 130° C., t-butylperoxyacetate may be added to the suspension without cooling and the polymerization may be continued at 130° C. Accordingly, it is possible to conduct the two-stage process of the present invention in an isothermal or substantially isothermal fashion. For example, according to a substantially isothermal technique, the temperature of the suspension preferably does not vary more than about 5° C. during the entire polymerization.

After the initiator has been incorporated in the suspension, the temperature of the suspension should be adjusted to or maintained at a temperature sufficient to achieve a desired rate of polymerization. Generally, polymerization proceeds at a faster rate when the entire polymerization is induced by means of one or more initiators. More particularly, when initiator is present in the suspension at all times during the polymerization, substantial completion of the polymerization may be achieved in 8 hours or less, preferably 5 hours or less. On the other hand, a two-stage polymerization, involving a first conversion to at least 50% with a thermal initiation technique, may be substantially complete in 14 hours or less, preferably 8 hours or less. In the initiator induced stage of the above-mentioned two-stage polymerization, the temperature and amount of initiator should preferably be sufficient to achieve the substantial completion of the polymerization before about 8 hours but not until after about 2 hours. It is also preferred to polymerize the styrenic monomers at a relatively constant rate during this stage of the polymerization. Thus, for example, the rate of polymerization during the free radical initiator induced polymerization stage of the two-stage polymerization may be maintained between about 25% conversion per hour and about 3% conversion per hour. On the other hand, when initiator is incorporated into styrenic monomer at the beginning of the polymerization, a conversion of as high as, e.g., 70% may be achieved in the first hour of the polymerization.

Whenever styrene or paramethylstyrene are polymerized in accordance with present invention, the temperature of the suspension should preferably be at least 120° C., most especially approximately 130° C., especially when the amount of the initiator is increased after the conversion has reached at least 50%.

It will be understood that one or more initiators may be used during the polymerization. These initiators may be added all at once but are preferably added in a continuous or an incremental fashion.

A preferred manner of performing an incremental addition of initiator to the suspension may be expressed in terms of the amount of initiator which is initially added to the reactor and the rate of decomposition of the inititator determined on the basis of the decomposition of the initiator in an inert solvent at the temperature corresponding to that of the suspension. More particularly, an increment of time sufficient to achieve about a 50% decomposition of the initial charge of initiator may be permitted to pass before a second charge of initiator is added to the suspension. The amount of initiator added in the second charge is preferably sufficient to replenish the amount of initiator such that the amount of non-decomposed initiator in the suspension after the second charge of the initiator is approximately equal to the amount of initiator present in the suspension immediately after the initial charge of initiator. Subsequent additions of initiator may be made in a manner analogous to the second addition of initiator. Preferably at least 3 additions of initiator, each addition taking place at different conversions of the monomer, may take place in an incremental addition of initiator. Thus, for example, t-butylperoxyacetate may be added at brief intervals (e.g., at about 25 minute intervals) while the suspension is maintained at a temperature of about 130° C.

It will be understood that the above-mentioned manner of conducting an incremental addition is but one example of such an incremental addition technique. This and other techniques are demonstrated in the Examples given hereinafter. Preferably, initiator is added to the suspension as continuously as possible to compensate for initiator which has decomposed. Also, the rate at which initiator is added to the suspension is preferably constant after initiator is initially added to the suspension.

After the polymerization is finished, the polymerization of the styrenic monomer or monomers is substantially complete. More particularly, the conversion is at least about 99% and preferably at least about 99.9%.

The polymer may be isolated from the suspension by any convenient means known by those skilled in the art, such as washing.

In accordance with the present invention, it is possible to obtain polymers having desirable properties. For instance, polymers produced in accordance with the present invention may have a relatively narrow range of molecular weights. This range may be expressed quantitatively in terms of the molecular weight distribution (MWD) of the polymer, which is the ratio of the weight average molecular weight (MW) to the weight number molecular weight (MN). More particularly, the MWD for paramethylstyrene homopolymers, produced according to the present invention, may be about 3 or less when the thermal initiation technique is used to achieve a partial conversion of at least 50%, and about 3-5, when initiator is present in the suspension at all stages of the polymerization.

It is also possible to achieve a desirably extrudable polymer in accordance with the present invention, even in the absence of an extrusion aid incorporated into the polymer, as evidenced by a relatively low die swell index. It is noted that die swell index is a measure of extrudate diameter to die diameter. Thus, the die swell index for a paramethylstyrene homopolymer produced according to the present invention may be from about 1.4 to about 1.6, when the thermal initiation technique is used to achieve a partial conversion of at least 50%, and about 1.6–1.8, when initiator is present in the suspension at all stages of the polymerization. By way of contrast, when a paramethylstyrene polymer is produced according to a conventional suspension process (e.g., where both benzoyl peroxide and t-butylperbenzoate are added to the suspension at the start of the polymerization), the resulting polymer may typically have a MWD of from 5 to 10 and a die swell index of from 1.8 to 2.0.

In accordance with the two-stage polymerization technique of the present invention, initiator levels can be reduced 50–90% over conventional polymerizations in which initiator is added to the suspension at the beginning of the polymerization. Furthermore, when initiator is present at all stages of the polymerization in accordance with the present invention, cycle times can be reduced up to 25% for batch preparations of comparable styrenic polymers. Moreover, molecular weights and distributions may be easily controlled to narrow limits.

The method of the present invention is particularly useful for the preparation of low melt index extrusion grade polymers and the preparation of fractional melt index polymers which can be useful for oriented films, blow molding resins, etc. This method is also particularly appropriate for continuous suspension polymerizations.

EXAMPLE 1

A suspension of 315 g of paramethylstyrene in 330 g of water was prepared using 6.4 g of tricalcium phosphate and 32 mg of polyparamethylstyrene (containing 10 mol percent sulfonic acid groups). This suspension in a 1-liter autoclave stirred at 600 rpm using a 2.5 inch diameter pitched blade stirrer was heated at 140° C. for 4 hours without added initiator. At the end of this time the suspension was cooled to 95° C. and a dispersion of 0.16 g of benzoyl peroxide in water was added thereto. This dispersion was prepared by dissolving the benzoyl peroxide in methylene chloride and adding to 15 ml of water containing 9 mg of "Gelvatol", a tradename of Monsanto, and evaporating the methylene chloride.

Figure 1:
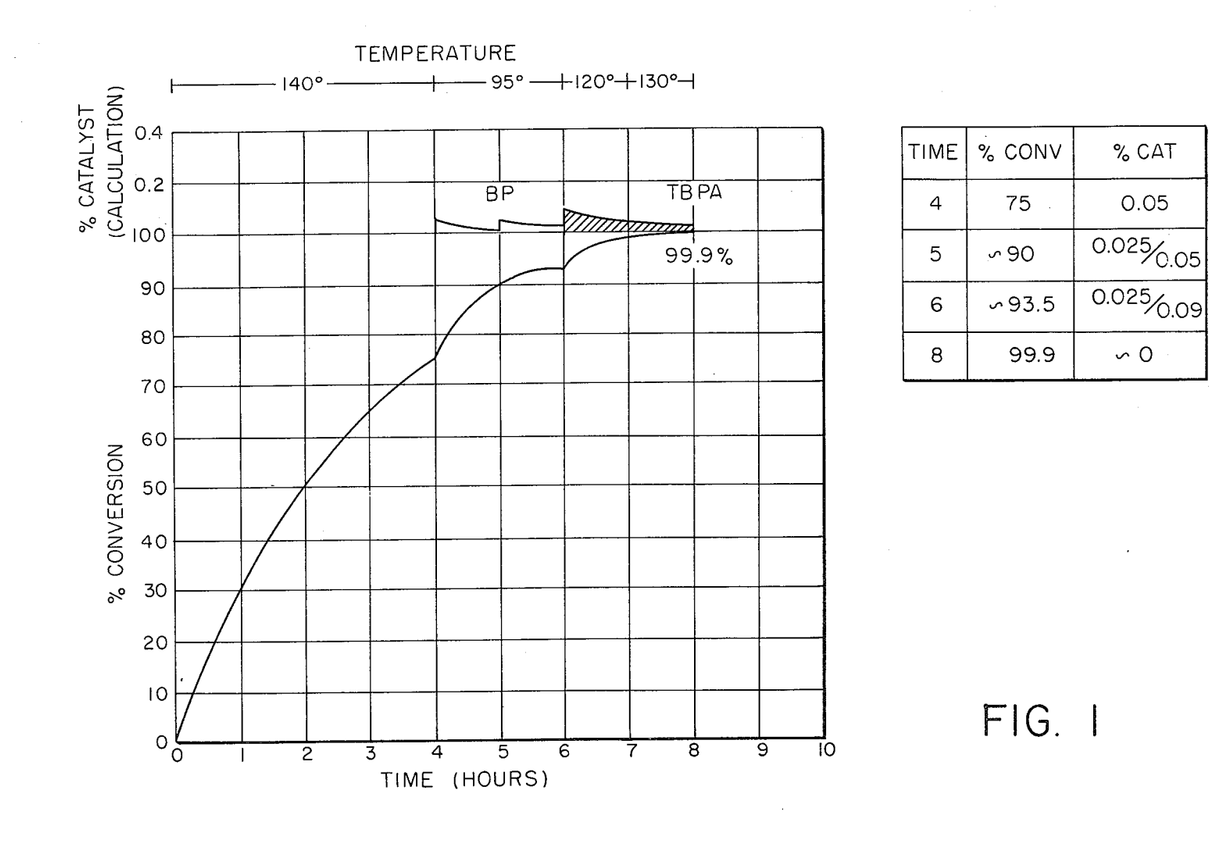
FIGS. 1-4 show the following parameters plotted as a function of time: (1) the percent conversion of paramethylstyrene monomer to polymer; (2) the % catalyst; and (3) the temperature.

Stirring of this suspension was continued at 95° and after 1 hour an additional 0.08 g of benzoyl peroxide dispersed in water was added. After a total of 2 hours at 95° C. a solution of 0.2 g of t-butylperoxyacetate ("Lupersol 70", a tradename of Lucidol) dissolved in 10 ml of methanol was added and the mixture heated to 120° C. for 1 hour and then to 130° C. for one hour. The catalyst additions and the polymerization rate data are summarized in FIG. 1.

At the end of the polymerization time, the conversion to polymer was greater than 99.9% and the product had a gel permeation chromatography (GPC) molecular weight (based on polystyrene calibration standards) of: $MW = 252,100$; $Mn = 92,250$; and $MWD = 2.7$. The melt index (condition G) was 2.79.

EXAMPLE 2

Figure 2:
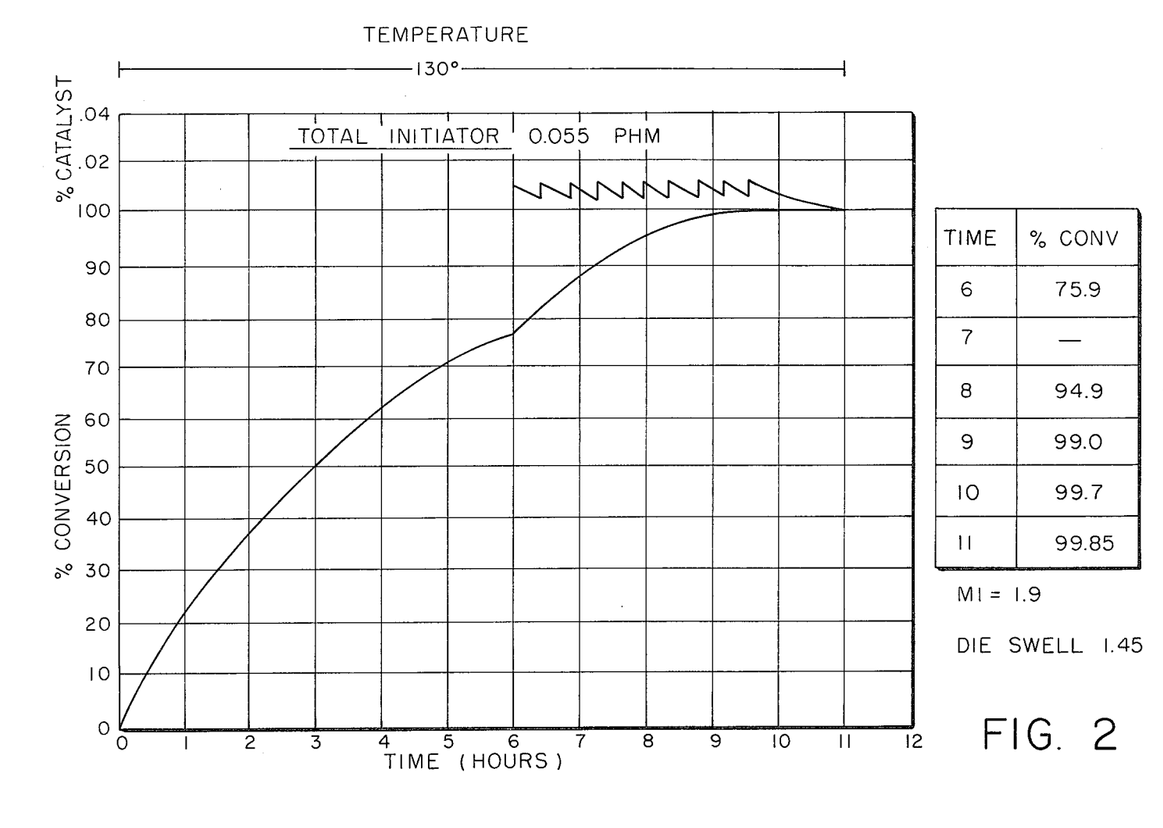

A 2 liter autoclave was charged with 630 g of paramethylstyrene, 660 ml of water, 32 mg of IRGANOX 1076, 1.2 mg of Perox blue dye (a tradename of the Morton Chemical Company), about 80 mg of polyparamethylstyrene extender (containing 10 mol percent sulfonic acid groups) and 12.4 g of tricalcium phosphate. This mixture was purged with nitrogen and heated to 130° C. with stirring at 600 rpm. After 6 hours at 130° C., 0.72 ml of a 10% solution of Lupersol 70 (a 70% solution of t-butylperoxyacetate) in methanol was injected into the autoclave. Thereafter, in 25 minute intervals, a total of 9 injections of 0.36 ml of a 10% solution of Lupersol 70 in methanol were added to the autoclave. Heating was maintained during this initiator induced stage at 130° C. for a total of 5 hours when the conversion had reached 99.85%. The product isolated from this reaction had a melt index (condition G) of 1.9 and a die swell index of 1.45. The catalyst additions and the polymerization rate data are summarized in FIG. 2.

EXAMPLE 3

Figure 3:
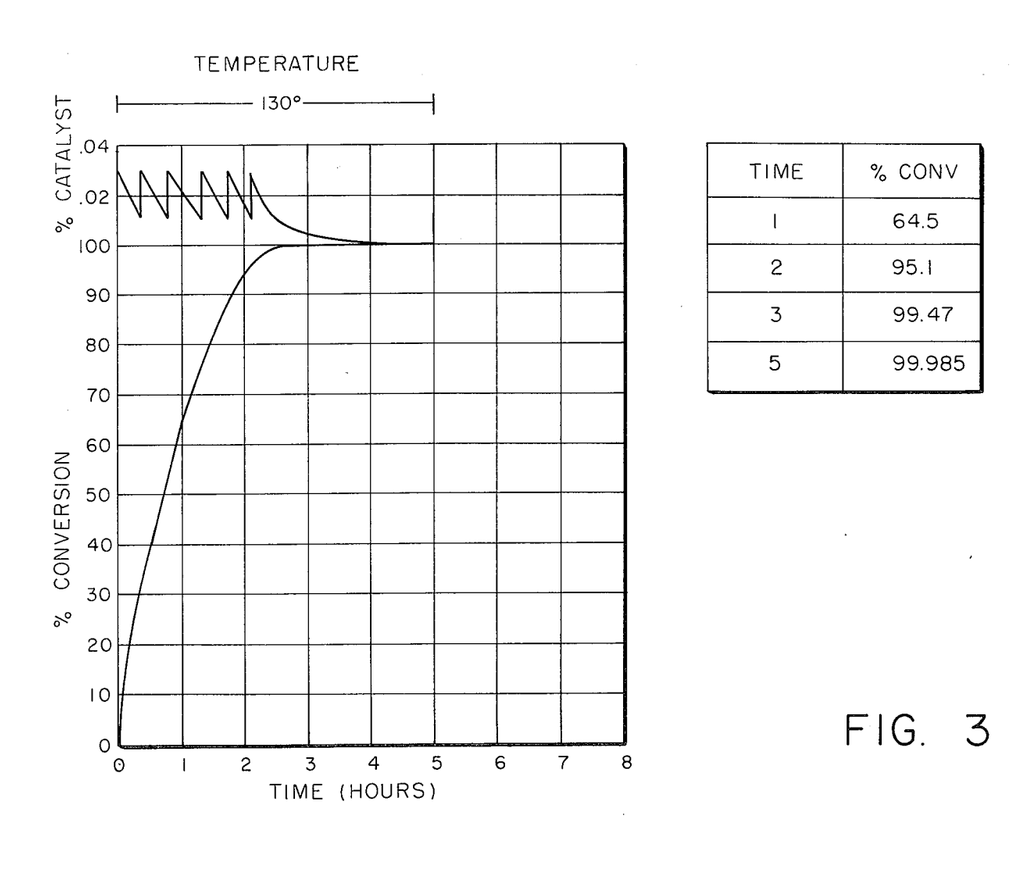

A 2 liter autoclave was charged with 630 g of p-methylstyrene (containing 31 mg of IRGANOX 1076, 1.2 mg of Perox blue dye and 80 mg of sulfonated poly-p-methylstyrene) together with 0.15 g of Lupersol 70 (a 70% solution of t-butylperoxyacetate) and 660 ml of water containing 12.4 g of tricalcium phosphate. This mixture was purged with nitrogen and heated to 130° with stirring. After 25 minutes at 130° C. Lupersol 70 (75 mg) was injected into the autoclave (as a 10% solution in methanol). A total of 5 injections of Lupersol 70 were added at 25 minute intervals. Heating was maintained at 130° for a total of 5 hours, when the conversion had reached 99.98%. The product isolated from this reaction had a melt index (Cond G) of 1.8 and had a GPC molecular weight (based on polystyrene calibration standards) of: MW=304,000; MN=94,000; and MWD=3.2. A total of 0.084 parts of Lupersol 70 per hundred parts of monomer were used in the polymerization. The catalyst additions and polymerization rate data are summarized in FIG. 3.

EXAMPLE 4

Figure 4:
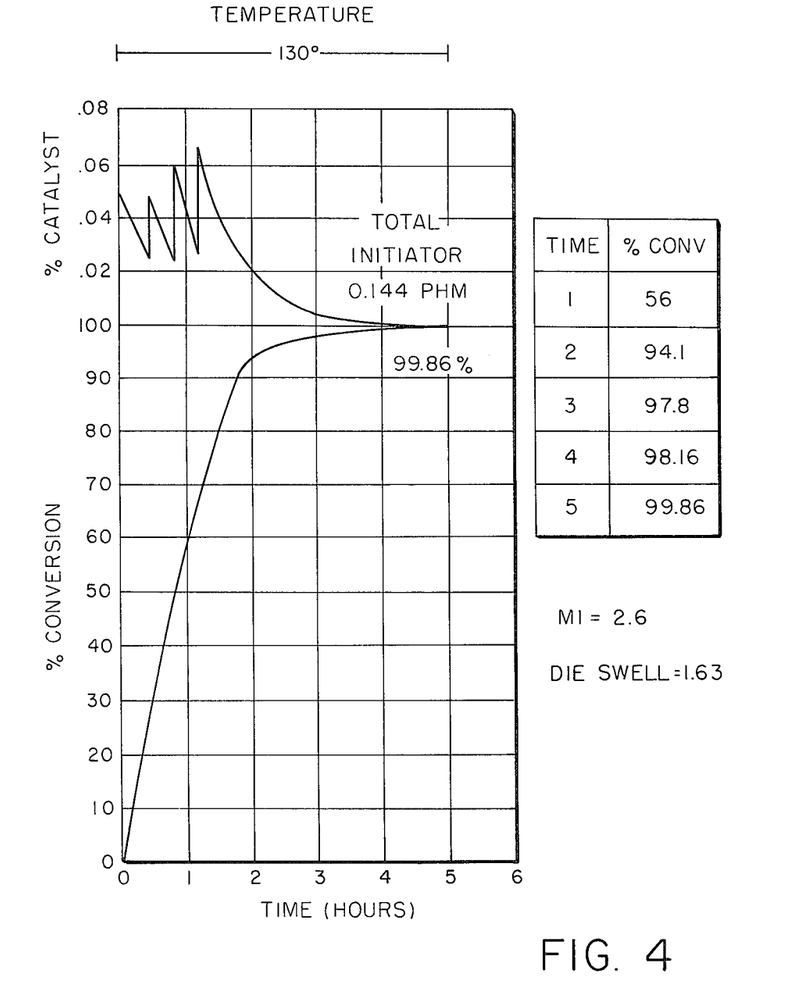

A 2 liter autoclave was charged with 630 g of p-methylstyrene (containing 32 mg of IRGANOX 1076, 1.2 mg. of Perox blue dye and 80 mg of sulfonated poly-p-methylstyrene) together with 0.30 g of Lupersol 70 (a 70% solution of t-butylperoxyacetate) and 660 ml of water containing 12.4 g of tricalcium phosphate. This mixture was purged with nitrogen and heated to 130° C. with stirring. After 25 minutes at 130° C., 1.8 ml of a 10% solution of Lupersol 70 in methanol was injected into the autoclave. Subsequently, and at 25 minute intervals, two additional injections of Lupersol 70 were made, each injection being 2.7 ml of a 10% solution of Lupersol 70 in methanol. Heating was maintained at 130° C. for a total of 5 hours, when the conversion had reached 99.86%. The product isolated from this reaction had a melt index (Cond G) of 2.6, a die swell index of 1.63 and a GPC molecular weight (based on polystyrene calibration standards) of: MW=310,000; MN=89,860; and MWD=3.45. The catalyst additions and the polymerization rate data are summarized in FIG. 4.

As used herein, the expression "styrenic monomer" is intended to connote the optional plurality of the expression "styrenic monomer or monomers".

As described herein, values for percent conversion are based upon the total amount of monomer present in the suspension before any polymer thereof is formed.

The present invention may comprise, consist essentially of or consist of the steps or elements recited herein.

What is claimed is:

1. A method for the suspension polymerization of one or more styrenic monomers, wherein said styrenic monomer or monomers are present in a suspension of droplets of said monomer or monomers dispersed throughout a continuous water phase, said method comprising the steps of:
   (a) forming a suspension containing essentially all of the styrenic monomer or monomers to be polymerized;
   (b) partially polymerizing said monomer or monomers in said suspension of step (a) until a conversion of from 50% to about 90% is achieved; and
   (c) increasing the amount of substantially water insoluble free radical initiator in the suspension obtained according to the partial polymerization step (b) and substantially completing the suspension polymerization by a free radical initiation technique, wherein the temperature of the suspension is at least 110° C. during the entire polymerization.

2. A method according to claim 1, wherein at least one free radical initiator is present during the entire polymerization.

3. A method according to claim 2, wherein said one or more styrenic monomers are selected from the group consisting of styrene, paramethylstyrene, metamethylstyrene, vinyl toluene, para-t-butylstyrene and parachlorostyrene.

4. A method according to claim 2, wherein only one styrenic monomer is polymerized and said one styrenic monomer is paramethylstyrene.

5. A method according to claim 2, wherein only one styrenic monomer is polymerized and said one styrenic monomer is styrene.

6. A method according to claim 2, wherein said substantially water insoluble free radical initiator is selected from the group consisting of lauroyl peroxide, benzoyl peroxide, t-butylperbenzoate and t-butylperoxyacetate.

7. A method according to claim 2, wherein a 60–80% conversion of the monomer is achieved in said step (b).

8. A method according to claim 7, wherein a paramethylstyrene homopolymer is formed which has a molecular weight distribution (MWD) of about 3–5 and a die swell index of from about 1.6 to about 1.8.

9. A method according to claim 8, which takes place substantially isothermally at approximately 130° C., wherein said free radical initiator is t-butylperoxyacetate, said t-butylperoxyacetate being added to said suspension incrementally or continuously.

10. A method according to claim 2, wherein said droplets are 0.15–0.5 cm in diameter.

11. A method according to claim 2, wherein the temperature of the suspension is at least 120° C. during the entire polymerization.

12. A method according to claim 2, wherein said polymerization is isothermal or substantially isothermal.

13. A method according to claim 2, wherein initiator is added to the suspension incrementally or continuously.

14. A method according to claim 13, wherein initiator is added to the suspension at a constant rate after said initiator is initially added to the suspension.

15. A method according to claim 2, wherein the conversion of monomer is at least 40% in the first hour of the polymerization and the polymerization is substantially complete in 8 hours or less.

16. A method according to claim 2, wherein the conversion of monomer is at least 55% in the first hour of the polymerization and the polymerization is substantially complete in 5 hours or less.

17. A method according to claim 2, wherein the water to monomer plus polymer ratio of the suspension is constant throughout the entire polymerization and said water to monomer plus polymer ratio is no greater than 1.2:1.

18. A method according to claim 2, wherein said suspension comprises one or more stabilizers which stabilize said suspension throughout the entire polymerization.

19. A method according to claim 2, wherein a non-expandable styrenic polymer is produced.

20. A method for the suspension polymerization of one or more styrenic monomers, wherein said styrenic monomer or monomers are present in a suspension of droplets of said monomer or monomers dispersed throughout a continuous water phase, said method comprising the steps of:
   (a) partially polymerizing said monomer or monomers by a thermal initiation technique, wherein said suspension is maintained in the absence of a free radical initiator until a conversion of from about 50% to about 90% is achieved; and
   (b) substantially completing the suspension polymerization of the suspension obtained according to the thermal polymerization step (a) by a free radical initiation technique, wherein the suspension is maintained in the presence of at least one substantially water insoluble free radical initiator.

21. A method according to claim 20, wherein the temperature of the suspension of said thermal initiation step (a) is sufficient to achieve said conversion before about 8 hours but not until after about 2 hours, and the temperature and amount of initiator of said step (b) is sufficient to achieve the substantial completion of the polymerization before about 8 hours but not until after about 2 hours.

22. A method according to claim 21, wherein said one or more styrenic monomers are selected from the group consisting of styrene, paramethylstyrene, metamethylstyrene, vinyl toluene, para-t-butylstyrene and para-chlorostyrene.

23. A method according to claim 21, wherein only one styrenic monomer is polymerized and said one styrenic monomer is paramethylstyrene.

24. A method according to claim 21, wherein only one styrenic monomer is polymerized and said one styrenic monomer is styrene.

25. A method according to claim 20, wherein said substantially water insoluble free radical initiator is selected from the group consisting of lauroyl peroxide, benzoyl peroxide, t-butylperbenzoate and t-butylperoxyacetate.

26. A method according to claim 20, wherein a 60–80% conversion of the monomer is achieved in said thermally initiated step (a).

27. A method according to claim 26, wherein a paramethylstyrene homopolymer is formed which has a molecular weight distribution (MWD) of about 3 or less and a die swell index of from about 1.4 to about 1.6.

28. A method according to claim 27, wherein said thermally initiated step (a) takes place at a temperature of from about 130° C. to about 140° C. and said initiator for said step (b) is t-butylperoxyacetate, said t-butylperoxyacetate being added to said suspension incrementally or continuously while said suspension is maintained at a temperature of approximately 130° C.

29. A method according to claim 20, wherein said droplets are 0.15–0.5 cm in diameter.

* * * * *